Figure 1:
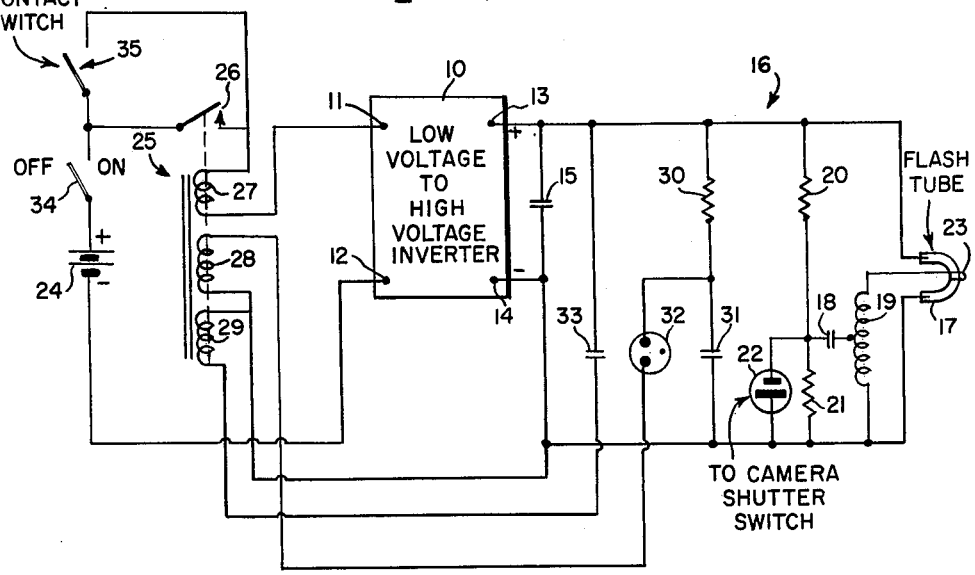

Oct. 27, 1964 J. L. JENSEN 3,154,732
ELECTRIC APPARATUS FOR CONTROLLING THE CHARGING
AND DISCHARGING OF A CAPACITOR
Filed Nov. 6, 1959

INVENTOR.
JAMES LEE JENSEN
BY
Francis A. Sirr
ATTORNEY

United States Patent Office 3,154,732
Patented Oct. 27, 1964

3,154,732
ELECTRIC APPARATUS FOR CONTROLLING THE CHARGING AND DISCHARGING OF A CAPACITOR
James Lee Jensen, St. Louis Park, Minn., assignor to Honeywell Inc., a corporation of Delaware
Filed Nov. 6, 1959, Ser. No. 851,354
9 Claims. (Cl. 320—1)

The present invention is concerned with an improved electric apparatus and specifically with an improved electric apparatus in which an inverter has its output connected to energize capacitive load means and has its input connected to a source of operating voltage, and where relay means is effective to control the inverter to provide intermittent charging of the capacitive load means to conserve energy of the source of operating voltage.

Specifically, the present invention achieves a reduction in the standby energy drain from the source of operating voltage by providing a relay which is connected in controlling relation to the inverter and which in turn is controlled by means which is responsive to charging of the capactive load to maintain the inverter operative until the capacitive load charges to a given value. When the capacitive load has been charged to this given value, the inverter is rendered inoperative. Further means are provided, including a timer, to periodically re-energize the relay metans and render the inverter again operative to charge the capacitor to thereby replenish the charge of the capacitor as this charge leaks off due to inherent leakage current. Further means are provided which energize the relay means upon a sudden discharge of the capacitive load to thereby render the inverter operative to recharge the capacitive load.

In its preferred embodiment, the present invention is shown as applied to an electronic type photographic flash unit. In the portable type electronic flash unit, it is customary to provide a low voltage battery which is connected to the input of a low-voltage to high-voltage inverter, whose output is connected to a capacitor. This capacitor is in turn connected to the main electrodes of a photographic flash tube of the gas fill type. Upon the photographic flash unit being switched from an off to an on position, it is desirable to charge the capacitor to a given value and to maintain this capacitor charge with a minimum amount of current drain from the low voltage batteries. Furthermore, upon the capacitor being discharged through the flash tube to produce a brilliant flash of light, it is desirable to immediately recharge this capacitor as fast as is practically possible.

The present invention achieves the above desired result by utilizing a relay having a winding connected in circuit with the input of the inverter to maintain the relay energized so long as sufficient current flows in the input circuit, this current being indicative of the fact that the flash capacitor is being charged. Upon the flash capacitor being charged, this relay winding is de-energized, or at least the relay current drops to a low value and the relay is no longer held in, and the low voltage batteries are disconnected from the input of the inverter, thereby reducing the standby current drain on these batteries. The capacitor, which is now in a charged condition, has an inherent leakage current and over a time period, the voltage present on this capacitor gradually decreases. This in turn reduces the amount of light available at the flash tube and since the amount of light at the flash tube must be maintained at a relatively uniform value to insure consistent photographic results, the present invention utilizes a timer type means connected to the output of the inverter and effective to again energize the relay to recharge the capacitor and replace this leakage current. Furthermore, upon the capacitor being substantially immediately discharged through the flash tube under the control of a camera shutter switch, it is desirable to render the inverter operative to again charge the capacitor. The present invention provides means connected to the output of the inverter and responsive to a sudden discharge of the capacitor to render the inverter operative to substantially immediately recharge the capacitor.

Figure 2:
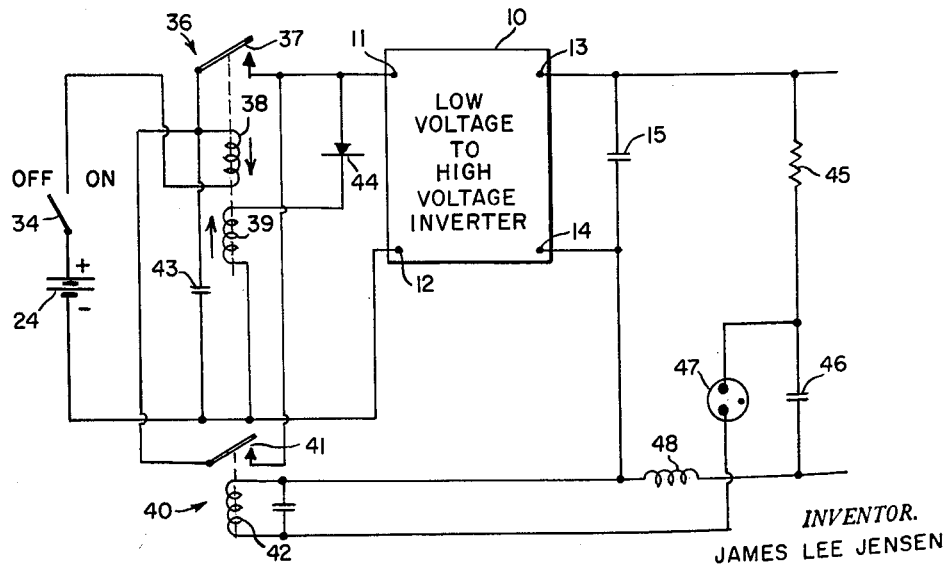

The present invention will be apparent to those skilled in the art upon reference to the following specification, claims, and drawings of which:

FIGURE 1 is a schematic representation of a first embodiment of the present invention; and
FIGURE 2 is a schematic representation of a second embodiment of the present invention.

FIGURE 1

Referring now to FIGURE 1, the reference numeral 10 designates a low-voltage to high-voltage inverter having low voltage input terminals 11 and 12 and high voltage output terminals 13 and 14. For purposes of simplicity, the inverter means 10 has been shown in block diagram form. Specifically, the inverter means 10 may consist of an electronic oscillator or mechanical vibrator which is energized from the input circuit means including terminals 11 and 12. This oscillator or mechanical vibrator is effective to chop the low voltage applied to the terminals 11 and 12. This chopped voltage, or A.C. voltage, is applied to a transformer which converts the low A.C. voltage to a relatively high A.C. voltage. The transformer is in turn connected to rectifying means whose output is connected to the terminals 13 and 14 such that the terminal 13 is positive with respect to terminal 14.

The output of inverter means 10 is connected to capacitive load means in the form of a capacitor 15. This capacitor is adapted to be charged such that its upper plate is positive with respect to its lower plate. Capacitor 15 forms the main storage capacitor of an electronic photographic flash unit which is designated generally by means of the reference numeral 16. This electronic flash unit includes a gas-filled electronic flash tube 17, a trigger capacitor 18 connected to a trigger transformer 19 and to a voltage divider in the form of resistors 20 and 21, a trigger electrode 23, and a socket 22 adapted to be connected to the shutter switch of an associated camera. This electronic flash unit is of a conventional type and functions such that the voltage present on capacitor 15 is effective, through the voltage divider 20–21, to charge capacitor 18. Upon the shutter actuator of an associated camera being depressed to actuate the shutter mechanism of the camera, the shutter switch of the camera closes to complete a circuit to discharge capacitor 18 through the lower portion of the trigger transformer 19. This produces a high voltage at transformer 19 and this voltage is applied to the trigger electrode 23 of flash tube 17. This in turn causes the gas within the flash tube 17 to ionize and capacitor 15 is suddenly discharged through the discharge tube to provide a brilliant flash of light to illuminate the subject to be photographed.

While the present invention may be utilized with a variety of capacitive loads, it is of particular utility in the case of the low voltage, battery operated, portable electronic flash units.

The reference numeral 24 designates a low magnitude source of operating voltage, for example, a plurality of D-size dry cell batteries. The source of operating voltage 24 is connected to the input terminals 11 and 12 of the inverter 10 under the control of relay means designated generally by means of the reference numeral 25.

Relay means 25 includes a normally open switch 26 and three energizing windings 27, 28 and 29. Winding 27 is disposed in the input circuit of inverter 10. Winding 28 is connected to timing means including resistor 30, capacitor 31, and neon tube 32. Winding 29 is connected to the output circuit of inverter 10 by means including capacitor 33.

The reference numeral 34 designates a main control switch in the form of an on-off switch, shown in its off position. The reference numeral 35 designates a further control switch of the momentary contact type.

Referring now to the operation of the apparatus of FIGURE 1, the apparatus is shown in its off position wherein switches 34 and 35 are in the open position, relay 25 is denergized, and capacitor 15 is in a discharged condition. To render the apparatus operative, it is necessary first to close switch 34, thus placing it in the on position. This action alone does not place the apparatus in the operative condition since it is now necessary to depress the momentary contact switch 35. This switch, when actuated, makes a momentary circuit which can be traced from the upper terminal of battery 24 through switch 34, switch 35, winding 27, and the input 11–12 of inverter 10 to the lower terminal of battery 24. This circuit is effective to both connect the input of inverter 10 to the source of operating voltage 24 and to initially energize relay 25. The energization of this relay causes normally open switch 26 to close and complete a circuit shunting the momentary contact switch 35. The apparatus of FIGURE 1 is now in an operating condition.

Inverter 10, which is now drawing electrical energy from battery 24, is effective to cause capacitor 15 to charge. This charging of capacitor 15 takes place over a time period, for example, 10 to 15 seconds in the case of an electronic photographic flash unit. During this time period, the electrical current flowing through the above traced circuit including winding 27 is of a sufficient magnitude to maintain this winding operatively energized and to maintain switch 26 closed. However, upon capacitor 15 receiving a given charge, the current drawn from battery 24 decreases to the extent that relay 27 is no longer operatively energized and the relay becomes de-energized to open switch 26. At this time, both switch 35 and switch 26 are in their open condition and the inverter 10 is now rendered inoperative to charge capacitor 15 since its input circuit 11–12 is disconnected from the source of operating voltage 24. However, capacitor 15 is now charged to a given state and enough electrical energy is stored in this capacitor to produce a controlled quantity of light, should the camera shutter switch be closed at this time.

Normally, the camera shutter contacts are not immediately closed and capacitor 15, which is normally a high voltage electrolytic capacitor, has an inherent leakage current which causes the electrical charge stored therein to decrease. It is therefore desirable to provide means to again connect the source of operating voltage 24 to the input circuit 11–12 of inverter 10 to restore the amount of electrical energy which has leaked off capacitor 15.

This means is provided in the form of a timer including resistor 30, capacitor 31 and neon tube 32. Resistor 30 and capacitor 31 are connected in series across capacitor 15 and the time constant of this series circuit determines the manner in which the voltage of capacitor 31 follows or receives charge from capacitor 15. A time period after capacitor 15 is charged, capacitor 31 is charged to a sufficient value to cause the neon tube 32 to become conductive. A current flow circuit can now be traced from the upper plate of capacitor 31 through neon tube 32 and winding 28 of relay 25 to the lower plate of capacitor 31. This current pulse through winding 28 is effective to operatively energize this winding and cause the switch 26 of relay 25 to again close.

Upon this switch closing, the above traced circuit which connects battery 24 to the input of inverter 10 is again completed and this circuit remains in a completed condition so long as the current flowing through winding 27 is of a sufficient value to maintain relay 25 operatively energized. As soon as capacitor 15 is again recharged to the given value, the current drawn from battery 24 decreases to the point where winding 27 is no longer operatively energized and switch 26 again opens.

In this manner, relay 25 cycles between an energized and a de-energized condition, maintaining the charge on capacitor 15 at a relatively constant value such that a controlled quantity of light will be produced at flash tube 17. It is recognized that at any time during this cycling, the camera shutter switch, which is connected to outlet 22, may be closed to effect exposure of the film and energization of the flash tube 17 in synchronism therewith. The sudden discharging of capacitor 15 through flash tube 17 is effective to again energize relay 25 through the medium of capacitor 33 and the winding 29 of relay 25.

This can be seen by considering the manner in which capacitor 33 is connected to the inverter output and to the flash tube. Capacitor 33 charges in somewhat the same manner as capacitor 15 by means of a circuit which can be traced from the output terminal 13 of inverter 10 through capacitor 33, and relay winding 29 to terminal 14 of inverter 10. Upon the camera shutter switch being closed, flash tube 17 is ionized and acts as a short circuit across capacitor 15 to immediately discharge this capacitor. Furthermore, capacitor 33 is likewise discharged through flash tube 17 and this pulse of current through winding 29 is effective to operatively energize winding 29 to cause switch 26 of relay 25 to close. Since capacitor 15 is now in a discharged condition, sufficient current flows in the input circuit 11–12 of inverter 10 to maintain winding 27 of relay 25 operatively energized and to hold switch 26 closed. This switch is maintained in a closed condition until capacitor 15 is again recharged to a given value.

FIGURE 2

Referring now to the apparatus of FIGURE 2, this apparatus, while utilizing the inverter 10 of FIGURE 1, utilizes a novel means which enables the momentary contact switch 35 of FIGURE 1 to be eliminated, utilizes a novel means to compensate for variations in voltage of the supply voltage source 24, and further utilizes a second relay to perform the function of the relay windings 28 and 29 of FIGURE 1.

Specifically, the apparatus of FIGURE 2 includes a first relay identified by the reference numeral 36 having a normally open switch 37 and first and second windings 38 and 39. The windings 38 and 39 are wound and connected in their respective circuits such that the current flow through these windings causes opposing magnetic flux, as indicated by the arrows provided in FIGURE 2. In other words, the circuit which energizes the winding 38 of relay 36 is effective to exert a magnetic force tending to cause switch 37 to close, while the current which flows through winding 39 of this relay exerts a magnetic force which opposes that of winding 38.

The reference numeral 40 identifies a second relay having a normally open switch 41 and a winding 42.

Considering the operation of the apparatus of FIGURE 2, the apparatus is shown in its inoperative condition wherein the main control switch 34 is in its off position. Relays 36 and 40 are therefore de-energized and capacitor 15 is in an uncharged condition. Upon closing of switch 34, to place it in its on position, a circuit can be traced from the upper terminal of battery 24 through switch 34, winding 38, and capacitor 43 to the lower terminal of battery 24. This circuit functions similarly to the above traced circuit in connection with FIGURE 1 which included the momentary contact switch 35. Upon the initial closing of switch 34, a pulse of current flows to charge capacitor 43 and the pulse of current is effective to operatively energize the winding 38 of relay 36, much in the same manner that the closing of switch 35 initially energized the winding 27 of relay 25.

Upon winding 38 being operatively energized, switch 37 is closed and a further circuit can now be traced from the upper terminal of battery 24 through switch 34, winding 38, switch 37, and the input 11–12 of inverter 10 to the lower terminal of battery 24. The winding 38 of relay 36 remains operatively energized so long as sufficient current flows in this above traced circuit, this current flow being indicative of the fact that capacitor 15 is charging. However, upon capacitor 15 being charged to the given value, the current supplied by battery 24 is appreciably reduced and winding 38 is operatively de-energized to cause the switch 37 to open and thereby reduce the standby current drain on battery 27.

Relay winding 39 and diode 44 constitute voltage compensation means which renders the apparatus of FIGURE 2 relatively insensitive to the magnitude of voltage of battery 24. In an electronic photographic flash unit it is desired to consistently provide a controlled quantity of energy at capacitor 15 so that the light produced at the flash tube is of a consistent value. It will be recognized that as the battery 24 provides more and more flashes of light, and as the battery ages, the terminal voltage of the battery reduces. Therefore, the tendency is for the amount of light available to also reduce. Winding 39, which produces a magnetic force to oppose that of winding 38, is energized by means of a circuit which can be traced from the upper terminal of battery 24 through switch 34, winding 38, switch 37, diode 44, and winding 39 to the lower terminal of battery 24. Therefore, when battery 24 is a relatively strong battery and would tend to charge capacitor 15 to its maximum value, relay winding 39 exerts its maximum opposing force and causes switch 37 to open at a certain value of charge on capacitor 15. When battery 24 is a relatively weak battery and would tend to charge capacitor 15 to a lower value, then the force exerted by winding 39 is also reduced and the net effect is to cause switch 37 to open when capacitor 15 has been charged to a value substantially equal to that to which it is charged when battery 24 is a strong battery. Diode 44 in the circuit is effective to subtract a fixed voltage drop from the supply voltage, producing a more pronounced effect in winding 39 due to supply voltage variation.

As described in connection with FIGURE 1, it is desirable, once capacitor 15 has been charged to periodically apply a recharging voltage to this capacitor to replace the energy dissipated by means of leakage current. This function is provided by relay 40 and by timing means including resistor 45, capacitor 46, and neon tube 47. The resistor 45 and capacitor 46 correspond to resistor 30 and capacitor 31 of FIGURE 1 and in FIGURE 2, the electronic flash circuit 16 has been eliminated to simplify the figure. Capacitor 46 of FIGURE 2 is charged in much the same manner as capacitor 15 and receives a given charge in a time period determined by the RC time constant of the charging circuit. A time period after capacitor 15 has been charged to the given value, capacitor 46 is charged to a value sufficient to cause neon tube 47 to become conductive. A discharging current flow circuit can now be traced for capacitor 46 from the upper plate of this capacitor through neon tube 47, winding 42, and inductance 48 to the lower plate of capacitor 46. This current flow circuit is effective to operatively energize the winding 42 of relay 40 and to cause its normally open switch 41 to close. The closing of this switch causes an input current to again flow to the input 11–12 of inverter 10. This current flow circuit can be traced from the upper terminal of battery 24 through switch 34, winding 38, switch 41, and the input 11–12 of inverter 10 to the lower terminal of battery 24. This current flow circuit in turn is effective to energize the winding 38 of relay 26 and to cause switch 37 to again close. The winding 38 now remains energized independent of the state of energization of relay 40 and switch 37 remains closed until the leakage current has been replaced at capacitor 15, at which time relay winding 28 becomes operatively de-energized, as above described.

In this way, the relay means 36–40 cycles between an energized and a de-energized condition to maintain the energy at capacitor 15 at a relatively constant value, waiting for the camera shutter switch to close to suddenly discharge capacitor 15.

Upon the closing of this shutter switch, capacitor 15 is suddenly discharged through the flash tube, as described in connection with FIGURE 1. This discharge current flow circuit includes inductance 48 and electrical energy provided in this inductance in addition to that stored on capacitor 46 is effective to render neon tube 47 conductive and to complete a circuit which can be traced from the right hand terminal of inductance 48 through capacitor 46, neon tube 47, and winding 42 to the left hand terminal of inductance 48. In this manner, winding 42 of relay 40 is operatively energized substantially immediately upon the discharge of capacitor 15 and switch 41 is closed to complete the above traced circuit which again energizes winding 38 of relay 36 to render inverter 10 operative to recharge capacitor 15.

From the above description it can be seen that I have provided an improved electrical apparatus in which an inverter energizes a capacitive load and is controlled by relay means to achieve a reduction in standby current drain from a source of operating voltage once the capacitive load has received a given charge. Other modifications of this invention will be apparent to those skilled in the art and it is therefore intended that the scope of the present invention be limited solely by the scope of the appended claims, of which:

I claim as my invention:

1. Electric apparatus comprising, a low voltage to high voltage inverter having a low voltage input circuit and a high voltage output circuit, said input circuit being adapted to be connected to a low magnitude source of operating voltage and said output circuit being adapted to be connected to capacitive load means, relay means having switch means and a plurality of windings, circuit means connecting said switch means in controlling relation to said inverter, first means including a first winding of said relay means connected in circuit with said input circuit and effective to maintain said inverter operative to charge the load means so long as electrical energy is required to charge the capacitive load means and to render said inverter inoperative to charge the load means upon the capacitive load means being charged to a given value, and second means including timing means and a further winding of said relay means connected in circuit with said output circuit and effective to render said inverter operative to again charge the load means a time period thereafter.

2. Electric apparatus comprising; a low voltage to high voltage inverter having an input circuit adapted to be connected to a low magnitude source of operating voltage and having an output circuit adapted to be connected to a capacitive load to charge the same; relay means having a plurality of windings and having switch means disposed in said input circuit, first means including a first winding of said relay means connected in said input circuit and responsive to the charging of the load means to maintain said input circuit connected to the source of operating voltage until such time as the load means is charged to a given value and to thereafter disconnect said input circuit from the source of operating voltage, second means including a second winding of said relay means connected in circuit with said output circuit and including timing means effective to reconnect said input circuit to the source of operating voltage a time period after it is disconnected by said first means, and further means including a winding of said relay means connected in circuit with said output circuit and effective to immediately reconnect said input circuit to said source of operating voltage upon a sudden discharge of the capacitive load means.

3. Electric apparatus comprising; a low voltage to high voltage inverter having an input circuit adapted to be connected to a low magnitude source of operating voltage and having an output circuit adapted to be connected to a capacitive load to charge the same; relay means having switch means disposed in said input circuit and having a first and a second actuating winding, a momentary contact switch connected in shunt with said relay switch means and effective to momentarily connect the first winding of said relay in series with a source of operating voltage to said input circuit, said relay switch means thereby being closed to maintain said source of operating voltage connected to said input circuit only so long as a current flows in said input circuit indicative of the charging of the capacitive load means, and thereafter opening to disconnect said input circuit from said source of operating voltage when said capacitive load means is charged to a given value, and further circuit means including timing means connected in circuit with said output circuit and to the second winding of said relay and effective to periodically energize said second winding and cause said switch means to be closed to restore the capacitive load means to said given state of charge.

4. Electric apparatus comprising; a low voltage to high voltage inverter having an input circuit adapted to be connected to a low magnitude source of operating voltage and having an output circuit adapted to be connected to a capacitive load to charge the same; relay means having a normally open switch disposed in said input circuit and having a first, second and third actuating winding, a momentary contact switch connected in shunt with said relay switch and effective upon being momentarily closed to connect the source of operating voltage and a first of said relay windings in series to said input circuit to thereby energize said relay and cause said relay switch means to close, said relay switch means remaining closed until the capacitive load means is charged to a given value, whereupon the current flow in said input circuit reduces to a value insufficient to maintain said first relay winding energized and said input circuit is disconnected from said source of energizing voltage, further circuit means including timing means and the second winding of said relay connected in circuit with said output circuit and effective to periodically energize said second relay winding to re-establish charging of said capacitive load means to recharge the load means as the load means discharges due to leakage current thereof, and further circuit means including the third winding of said relay connected to the output circuit of said inverter means and effective to immediately energize said third relay winding upon a sudden discharging of the capacitive load means.

5. Electric apparatus comprising; a low voltage to high voltage inverter having an input circuit adapted to be connected to a low magnitude source of operating voltage and having an output circuit adapted to be connected to a capacitive load to charge the same; a first relay having switch means disposed in said input circuit and including an actuating winding connected in circuit with said input circuit, said first relay being effective to maintain said input circuit connected to a source of operating voltage so long as current flows in said input circuit indicative of the charging of the capacitive load means and to thereafter disconnect said input circuit from said source of operating voltage, a second relay having switch means connected in parallel with the switch means of said first relay and having an actuating winding connected in circuit with said output circuit, means including timing means and the actuating winding of said second relay effective to periodically connect said input circuit to the source of operating voltage to periodically recharge the capacitive load as the capacitive load discharges due to leakage current thereof.

6. Electric apparatus comprising; a voltage inverter having an input circuit adapted to be connected to a source of operating voltage and having an output circuit adapted to be connected to a capacitive load to charge the same; a first relay having a normally open switch disposed in said input circuit and having an actuating winding, circuit means connecting said actuating winding in circuit with said input circuit means to mantain said first relay winding energized and said source of operating voltage connected to said input circuit means so long as said capacitive load is charged below a given value, said first relay being effective upon said capacitor being charged to said given value to disconnect the source of operating voltage from said input circuit means, a second relay including a normally open switch connected in parallel with the normally open switch of said first relay and including an actuating winding, means including a timer connected to the winding of said second relay and effective to energize said second relay winding for a time interval to thereby reconnect the source of operating voltage to said input circuit to provide an interval for charging the capacitive load means to replace leakage current thereof, and further means including means connecting the winding of said second relay to the output circuit of said inverter means and effective to immediately reconnect the source of operating voltage to said input circuit upon a sudden discharge of the capacitive load means.

7. Electric apparatus comprising; an inverter having an input circuit adapated to be connected to a source of operating voltage and having an output circuit adapted to be connected to a capacitive load to charge the same; a relay having normally open switch means disposed in said input circuit and having an actuating winding, a main control switch adapted to connect said input circuit to a source of operating voltage, a capacitor, first circuit means connecting said relay winding, said capacitor and said main control switch in series to the source of operating voltage to provide a pulse of electrical current to energize said relay winding upon said control switch being closed, and second circuit means connecting said relay winding, said relay switch, said input circuit and said main control switch in series to the source of operating voltage to maintain said relay winding energized so long as sufficient current flows to the input of said inverter.

8. Electric apparatus comprising; an inverter having an input circuit adapted to be connected to a source of operating voltage and having an output circuit adapted to be connected to a capacitive load to charge the same; relay means having normally open switch means disposed in said input circuit and having a first relay winding, means adapted to initially energize said first relay winding to cause said switch means to close and thereby connect the source of operating voltage to said input circuit to effect charging of the capacitive load, said first relay winding being maintained energized so long as sufficient current flows in said input circuit, a second relay winding constructed and arranged to oppose the magnetic flux of said first relay winding, and means connecting said second relay winding to said source of operating voltage to function as voltage compensation means to render the electrical apparatus relatively insensitive to variations in the voltage magnitude of the source of operating voltage.

9. Electric apparatus comprising; a low voltage to high voltage inverter having an input circuit adapted to be connected to a low magnitude source of operating voltage and having an output circuit adapted to be connected to a capacitive load to charge the same; relay means having switch means disposed in said input circuit and having a plurality of windings; first means including a first winding of said relay means connected in circuit with said input circuit responsive to charging of the load means and effective to maintain said input circuit connected to the source of operating voltage until such time as the load means is charged to a given value and to thereafter disconnect said input circuit from the source of operating voltage, second means including a second winding of said relay means and including timing means connected in circuit with said output circuit and effective to reconnect said input circuit to the source of operating voltage a time period after it is disconnected by said first means, and further means including a winding of said relay means connected in circuit with the load means and responsive to a discharging of the load means to reconnect said input circuit to the source of operating voltage independent of the operation of said second means.

References Cited in the file of this patent

UNITED STATES PATENTS

| | | |
|---|---|---|
| 2,586,589 | Willemse | Feb. 19, 1952 |
| 2,901,671 | Most | Aug. 25, 1959 |
| 2,977,524 | Lingle | Mar. 28, 1961 |